Oct. 29, 1963 M. SCHEERBARTH 3,108,811

SCANNING ARM FOR SCANNING RECORDS HAVING STEREOPHONICALLY ASSOCIATED SIGNALS RECORDED IN ONE GROOVE

Filed Oct. 29, 1959 2 Sheets-Sheet 1

INVENTOR
M. SCHEERBARTH
BY Frank R. Jifari
AGENT

INVENTOR
M. SCHEERBARTH
BY Frank R. Trifari
AGENT

United States Patent Office 3,108,811

Patented Oct. 29, 1963

3,108,811

SCANNING ARM FOR SCANNING RECORDS HAVING STEREOPHONICALLY ASSOCIATED SIGNALS RECORDED IN ONE GROOVE

Maximilian Scheerbarth, Berlin-Charlottenburg, Germany, assignor to North American Philips Company, Inc., New York, N.Y., a corporation of Delaware Filed Oct. 29, 1959, Ser. No. 849,479
Claims priority, application Germany Nov. 24, 1958
4 Claims. (Cl. 274—23)

The invention relates to a scanning or pick-up arm of a record player for scanning or playing records with stereophonically associated signals recorded in one groove. In the reproduction of sound from such records it is necessary to orientate the pick-up or head so that the needle is, accurately as possible, at right angles to the record. If necessary, an angular deviation of 1° is permissible. Maintaining such a small tolerance, which does not apply to the pick-up of monaural records in which deviations up to about 9° were permissible, requires changes in the manufacture of stereo pick-up arms which introduce great difficulties and high costs.

In accordance with the invention manufacturing difficulty is avoided since it is not necessary to change the manufacturing method or the accuracy requirements.

The invention briefly described, comprises a pick-up arm secured to a component or integral part, which is provided with two degree freedom of movement, by means of which the scanning needle can be placed at right angles to the record by twisting the scanning arm about its longitudinal axis and/or bending the arm about a transverse axis perpendicular to the longitudinal axis in the horizontal plane.

If the scanning arm is made, for example, of sheet metal, which, for the sake of rigidity, has a U-shaped profile, the two flanges of the U-shaped profile are, in accordance with the teachings of the invention, cut open in the proximity of the end supporting the pick-up head, down to the intermediate piece, which itself, is provided on either side with recesses. The recesses of the intermediate piece constitute prolongations of the flange cuts. It is thus possible to twist and/or bend the pick-up arm, so that the pick-up needle can be accurately located.

If the scanning arm is made of a synthetic substance, which does not allow it to be twisted or bent, the arm, according to known practices, is provided with a clamping piece, by means of which the arm is journalled on a vertical shaft arranged on the mounting plate of the record player. According to this invention, the known clamping piece is replaced by a strap means having an apertured plate to receive the vertical shaft about which the arm pivots in a horizontal plane. The other end of the strap or narrow, flat piece of material, is connected to a strong mounting plate, to which the pick-up arm itself is secured. In this case the narrow, flat piece of material, or strap, permits deformation of the strap means. Thus, a torsion (twisting and/or bending) for adjustment of the pick-up needle is provided in the prescribed sense.

It is efficacious to orient the longitudinal sides of the piece of flat material of the clamping piece, so that these sides are parallel to the torsion or twisting axis, parallel to the longitudinal axis of the pick-up arm and hence parallel to the tangent of the sound groove at the contact point of the needle without adjustment. If this orientation is not used, an undesired oblique position of the pick-up needle is obtained after adjustment. Indeed, in the case of curved scanning arm such adjustment may not be essential if the piece of flat material extends in the direction of the arm and the axis of curvature is not too small, however, it is more favorable to positively cause the longitudinal sides of the piece of flat material to extend parallel to the tangent of the sound grooves by adjustment.

In accordance with a further embodiment of the invention the pick-up arm clamping member is formed so that the deformable part of the fastening strap is connected with the screw plate of the pick-up arm by an intermediate flat or blade spring which constitutes the pivotal axis in a vertical plane, i.e. permits of moving the scanning arm vertically to the record. If a horizontal journal of the kind heretofore known is used, which provides the necessary movability of the pick-up arm by means of a pivotal horizontal shaft or the like, there is the risk that the needle location, once obtained with accuracy, shifts, since the shaft bearing has a certain degree of irregularity. This risk, of using the known journal is avoided by means of a thin blade spring as more fully described hereinafter.

The drawing shows two embodiments of the invention in diagrammatical views.

Figures 1, 2:
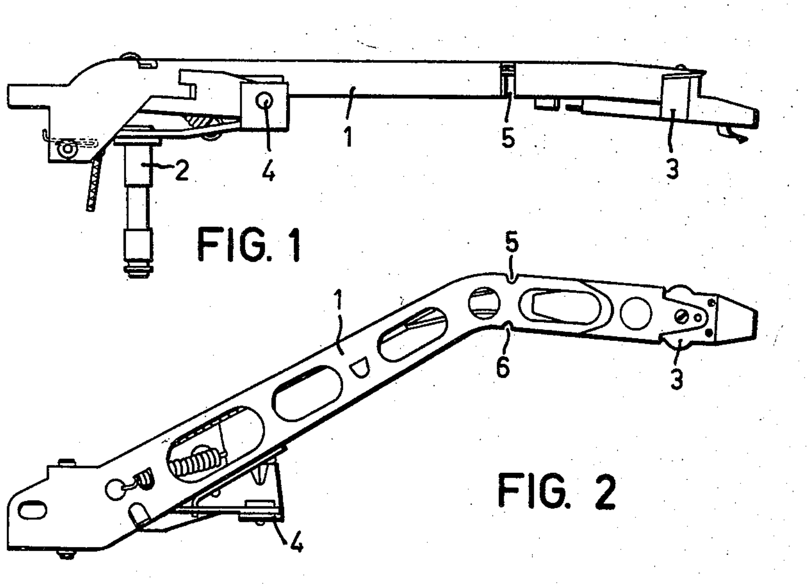
FIG. 1 is a side view of a pick-up arm formed from sheet iron with a U-shaped profile.
FIG. 2 is a plan view of the pick-up arm shown in FIG. 1.
Figure 3:
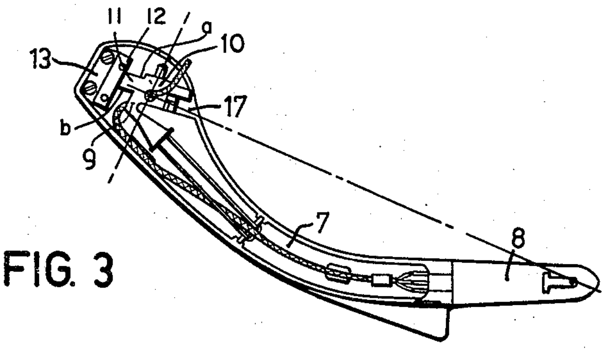
FIG. 3 shows a pick-up arm of a synthetic substance, viewed from below.
Figure 4:
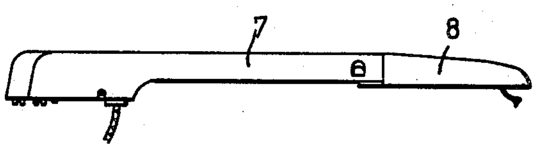
FIG. 4 is a side view of this pick-up arm.

The pick-up arm shown in FIGS. 1 and 2 consists of thin sheet metal of generally U-shaped cross section and the top side of which (the intermediate piece of the U-shape) is provided with holes to reduce the weight. At one end the pick-up arm 1 is provided with a pivotal shaft 2, by which the arm is journalled for horizontal movement in a vertical sleeve secured to the base plate of the record player as is well known. At the other end of the pick-up arm 1 the pick-up 3 is secured, which is vertically pivotable by means of a horizontal pin 4; this will not be described further herein, since it is not essential to the invention.

In the proximity of the end of arm 1 containing the pick-up 3 the two flanges of the U-shaped profile are opened by cuts 5 and 6 up to the intermediate piece. As is evident from FIG. 2 the intermediate piece of the U-shaped profile is also provided on each side with recesses 5 and 6, which constitute prolongations of the cuts of the flanges.

Thus, the pick-up arm is provided with a constriction which permits adjustment of the pick-up arm to accurately position the needle at right angles to the record.

A further embodiment of the invention is shown in FIGS. 3 to 6. The scanning arm 7 consists of a synthetic substance and the thicker end provision is made of a vertical shaft (not shown) such as element 2 of FIG. 1 for pivotal movement of the scanning arm in a horizontal plane. At the other end the pick-up 8 can be secured in a known manner.

The fastening of the pick-up arm to the vertical shaft is obtained by means of a fastening strap 9, which is secured in the hollow space of the widened end of the scanning arm. It is evident from FIGS. 5 and 6 that this fastening strap consists of a suitably apertured angular piece 10, to be slipped on the shaft, which piece 10 connects, via a narrow piece or strap of flat material 11, with the strong fastening plate 12, to which the pick-up arm itself is secured. From FIG. 3 it is clearly evident also that the longitudinal sides *a* and *b* of the piece of flat material 11, which sides define planes parallel to the longitudinal axis of same, are made substantially parallel to a line passing through the pivotal axis of the arm 7 and the contact point of the needle of such pick-up 8. It is thus ensured that with slight adjustment of strap 9 the pick-up needle is accurately located relative to the record or sound groove.

Figure 5:
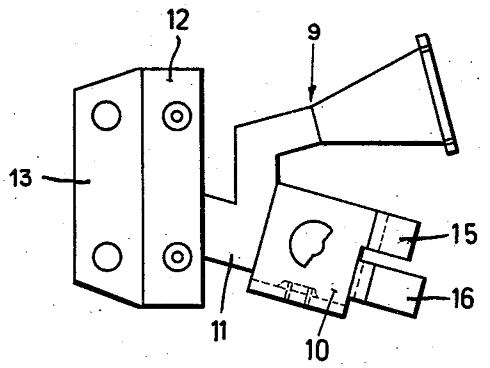
FIG. 5 is a plane view of a slightly modified fastening strap for use with a pick-up arm according to FIGS. 3 and 4.
Figure 6:
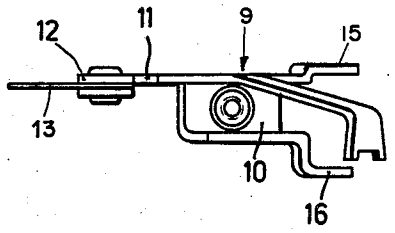
FIG. 6 is a side view of this fastening strap.

Moreover, the strong fastening plate 12, in the structure shown in FIGS. 5 and 6, can be connected with the pick-up arm, via the screw plate 13 (FIG. 3) by clamping a thin blade spring (not shown) between elements 12 and 13 which permits of moving the arm vertically to the record. This movement is limited by providing at the angular piece 10 stops 15 and 16, which co-operate with an opposite part 17 of the wall of the pick-up arm. This blade spring suspension also permits of maintaining the accurate, resultant adjustment of the scanning needle.

What is claimed is:

1. In a record player, a pick-up arm having a transducer operatively associated with a first end portion thereof, support means operatively associated with a second end portion thereof, said support means having a fastening strap member adapted to be mounted on a suitable vertical pivot member or gudgeon for pivotally supporting said arm, a narrow piece of flat strap material located between said first end portion of said arm and the fastening strap of said support member, whereby said narrow piece of flat strap material may be bent and twisted to properly position said transducer with respect to a record to be played.

2. In a record player, a metallic pick-up arm having a transducer operatively associated with a first end portion thereof, support means operatively associated with a second end portion thereof, said support means having a fastening strap member adapted to be mounted on a suitable vertical pivot member or gudgeon for pivotally supporting said arm, a narrow piece of flat strap material joining said first and second end portions of said arm, whereby said narrow piece of strap material may be bent and twisted to properly position said transducer with respect to a record to be played.

3. In a record player according to claim 2 wherein said arm has a generally inverted U-shaped cross-sectional profile and said narrow piece of strap material is defined by cuts in the side walls of said arm and extending into the intermediate piece of said U-shaped profile.

4. In a record player, a pick-up arm of relatively rigid non-deformable material having a transducer operatively associated with a first end portion thereof, a support means operatively associated with a second end portion thereof, said support means having a fastening strap member adapted to be mounted on a suitable vertical pivot member or gudgeon for pivotally supporting said arm, a fastening plate fastened to said second end portion of said pick-up arm and a narrow piece of flat strap material interconnecting said fastening strap and said fastening plate, whereby said narrow piece of flat strap material is bent and twisted to properly position said transducer with respect to a record to be played.

References Cited in the file of this patent

UNITED STATES PATENTS

| | | |
|---|---|---|
| 2,308,795 | Vermeulen | Jan. 19, 1943 |
| 2,776,144 | Nichols | Jan. 1, 1957 |
| 3,028,161 | Siebert | Apr. 3, 1962 |

FOREIGN PATENTS

| | | |
|---|---|---|
| 759,394 | Great Britain | Oct. 17, 1956 |